Figure 1:
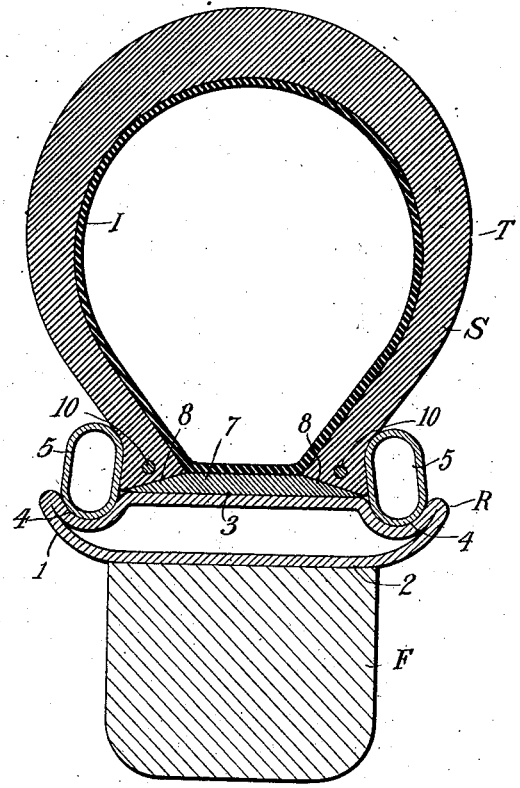

E. HOPKINSON.
VEHICLE WHEEL.
APPLICATION FILED MAR. 8, 1905.

937,808.

Patented Oct. 26, 1909.

Witnesses

Ernest Hopkinson, Inventor
By his Attorney

UNITED STATES PATENT OFFICE.

ERNEST HOPKINSON, OF EAST ORANGE, NEW JERSEY.

VEHICLE-WHEEL.

937,808.                    Specification of Letters Patent.       Patented Oct. 26, 1909.

Application filed March 8, 1905. Serial No. 249,014.

*To all whom it may concern:*

Be it known that I, ERNEST HOPKINSON, a citizen of the United States, residing in East Orange, county of Essex, and State of New Jersey, have invented certain new and useful Improvements in Vehicle-Wheels, of which the following is a specification.

This invention relates to vehicle wheels, and particularly to resilient tires for such wheels and the devices employed for securing the tires in position upon the wheel rims.

A primary object of the invention is to provide a tire with simple and effective means by which the tire may be positively secured upon the wheel rim in such manner that no "creeping" of the tire can take place.

The invention is particularly applicable to tires which are substantially inextensible at the base, and one object of the invention is to provide means whereby such tires may be tightened upon the rim so that the frictional engagement of the base of the tire with the tire seating surface of the rim will render "creeping" of the tire impossible.

The invention also contemplates the provision of a tire and novel devices by which it may be positively secured upon the rim with very little effort and in a very short time.

In the drawings illustrative of the invention, I have shown tires of one type only, namely, that which comprises an outer shoe or casing and an inflatable inner tube. In the several tires illustrated, the outer shoe or casing is provided at its edges with inextensible hoops or bands. It is to be understood, however, that the invention is applicable to tires of other forms, such as solid tires, cushion tires or single tube pneumatic tires; and the scope of the particular invention is clearly defined in the appended claim.

Figure 2:
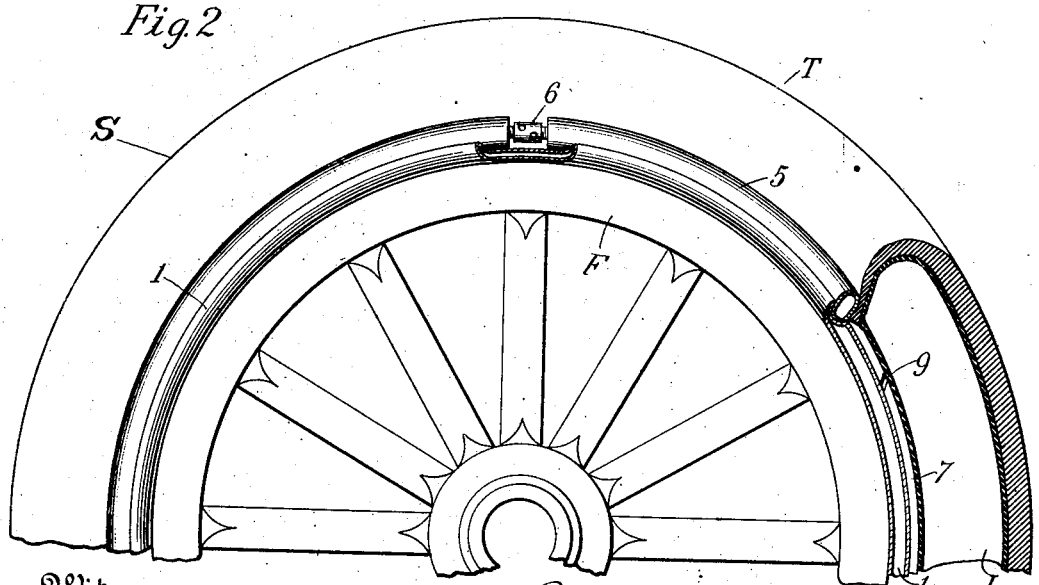

In the drawings, in which corresponding parts are designated by similar characters of reference: Figure 1 is a transverse sectional view through a wheel felly, wheel rim and tire embodying the invention. Fig. 2 is a fragmentary view in side elevation of a wheel equipped with a tire and rim of the character shown in Fig. 1, portions of the tire and rim being broken away to show the internal construction.

Referring to the drawings, F designates the felly of the wheel which may be of any ordinary or preferred construction. The wheel rim, which is designated R, is secured upon the felly F in any preferred manner and it comprises several members, the main member 1, which is preferably formed hollow, as shown, for the sake of lightness, presenting an inner transversely flat wheel face 2 for contact with the felly and an outer transversely flat tire face 3. At either side of the main rim member 1, a shallow channel 4 is formed to present a seat for a removable side flange 5 which is rendered expansible and contractible by means of a turn buckle 6 or equivalent device which is interposed between the ends of the side flange. The side flanges 5 are preferably tubular in form and are laterally flattened to present suitable surfaces for engagement with the sides of the outer casing of the tire.

Encircling the main rim member 1 and resting upon the outer, or tire, face 3 is a ring or hoop 7 which presents an outer face which is beveled at either side to afford oppositely inclined tire seating surfaces 8. Between the two inclined surfaces 8, the outer face of the hoop presents an intermediate surface which is preferably transversely flat, as shown, and in order that the hoop may embrace the main rim member closely when in position thereon and also be easily applicable to the main rim member or removable therefrom, the hoop 7 is cut transversely as shown at 9 in Fig. 2.

The tire, which is designated as T, comprises an inflatable inner tube I of the usual construction and an outer shoe S, which is provided near its edges with inextensible hoops 10 formed of one or more turns of wire, as is usual in tires of the type commonly known as "Dunlop" tires. The edges of the outer shoe S of the tire are preferably formed as shown in the drawings, presenting inclined surfaces for contact with the inclined tire seating surfaces 8 on the outer face of the hoop 7. It is not essential, however, that the tire casing be constructed with these inclined surfaces at its edges, as an outer casing of the ordinary "Dunlop" construction can be employed instead.

In applying the tire to a wheel equipped with the rim above described, the procedure may be as follows: One of the detachable side flanges may be secured in position upon the rim, then the tire may be partially positioned upon the rim with one edge of the outer casing in contact with the side flange which is already in position and the other edge of the outer casing overhanging the opposite edge of the rim. The hoop 7 may then be placed upon the main rim member between the rim and the inner tube of the tire, after which the overhanging edge of the outer casing of the tire may be pushed into contact with the adjacent inclined tire seating surface 8 upon the outer face of the hoop 7. When the operation of applying the tire has progressed to this extent, one edge of the hoop 7 will project over the adjacent channel 4 which forms a seat for the side flange which is not yet in position, and in order to force the tire and the hoop 7 into the position shown in Fig. 1, the remaining side flange must be applied to the rim and drawn into engagement with its seat by means of the turn buckle 6, which affords means whereby the side flange may be powerfully contracted. As the remaining side flange is contracted, the inclination of the outer side of the channel 4 which forms the flange seat, coöperates with the corresponding surface of the side flange to force the flange laterally against the adjacent surface of the tire, which is thereby caused to ride up on the inclined or beveled tire seating surface of the hoop 7. At the same time the hoop 7 is forced laterally toward the side flange which is already in position and the edge of the hoop which is adjacent to the side flange already applied is forced between the rim and the adjacent edge of the outer shoe of the tire, thus causing that edge of the outer shoe of the tire to ride up on the inclined tire seating surface so as to tighten the tire thereon.

When the parts are in the position shown in Fig. 1 and both side flanges rest firmly in their seats, the edges of the outer shoe or casing of the tire will be stretched to the full extent permitted by the inextensible hoops or bands 10 arranged therein and the pressure exerted by the base of the outer shoe or casing of the tire against the inclined tire seating surfaces 8 will operate effectively to prevent any "creeping" of the tire upon the rim, the pressure of the tire against the hoop 7 serving also to hold the hoop in close contact with the main rim member to prevent any slipping of the hoop.

In order to remove the tire from the rim, the series of operations above described is reversed. One of the side flanges 5 is expanded by the use of its turn buckle until it may be removed from its seat, then the tire and hoop 7 may be removed laterally until they pass off the rim. Ordinarily, the removal of one of the side flanges 5 relieves the pressure of the outer casing upon one side of the hoop 7, as the side of the outer casing tends to slide off the inclined seating surface upon which it rests. If, however, the outer casing does not slip off the hoop 7 at one side as soon as the adjacent side flange is removed, the outer casing may be worked to and fro laterally a few times to effect the loosening of the casing and the hoop upon the rim.

From the foregoing description it will be readily seen that the tire may be very quickly applied to the rim and easily removed therefrom; that when the side flanges are in position upon their seats the tire will be held in firm engagement with the rim so that no creeping can take place; and that by using hoops 7 of different thicknesses, any small variations in the diameters of the tires and rims may be compensated for.

Having thus described my invention, what I claim as new and desire to secure by Letters Patent is:

The combination with a wheel rim having an inclined flange seat and a contractible and expansible side flange engaging said flange seat, of a hoop or band encircling said rim and presenting oppositely inclined tire seating surfaces.

In witness whereof, I have hereunto set my hand in the presence of two witnesses.

ERNEST HOPKINSON.

Witnesses:
  H. RICHARD WÖBSE,
  RALPH HANCOCK.